US012127586B2

(12) United States Patent
Liu et al.

(10) Patent No.: US 12,127,586 B2
(45) Date of Patent: Oct. 29, 2024

(54) ELECTRONIC CIGARETTE ATOMIZING CORE AND ATOMIZER

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 292 days.

(21) Appl. No.: 17/636,846

(22) PCT Filed: Aug. 10, 2020

(86) PCT No.: PCT/CN2020/108057

§ 371 (c)(1),
(2) Date: Feb. 18, 2022

(87) PCT Pub. No.: WO2021/031891

PCT Pub. Date: Feb. 25, 2021

(65) Prior Publication Data

US 2022/0295876 A1 Sep. 22, 2022

(30) Foreign Application Priority Data

Aug. 22, 2019 (CN) ......................... 201910776454.0
Aug. 22, 2019 (CN) ......................... 201921375561.4

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/44* (2020.01); *A24F 40/485* (2020.01); *B05B 17/0684* (2013.01)

(58) Field of Classification Search
CPC .......... A24F 40/05; A24F 40/10; A24F 40/44; A24F 40/46; A24F 40/485
See application file for complete search history.

(56) References Cited

U.S. PATENT DOCUMENTS

2020/0178606 A1* 6/2020 Liu ......................... A24F 40/48
2020/0214349 A1* 7/2020 Liu ....................... A24F 40/485
(Continued)

FOREIGN PATENT DOCUMENTS

CN 206025225 U 3/2017
CN 208472852 U 9/2017
(Continued)

OTHER PUBLICATIONS

International Search Report dated Oct. 29, 2020 for International Application No. PCT/CN2020/108057, 3 pages.

*Primary Examiner* — Hae Moon Hyeon
(74) *Attorney, Agent, or Firm* — MASCHOFF BRENNAN; Michael Mauriel

(57) ABSTRACT

An electronic cigarette atomizing core and an atomizer are disclosed. The electronic cigarette atomizing core includes an outer sleeve and an inner sleeve, wherein the outer sleeve is provided with a liquid passing port. An atomization cavity is provided between the bottom of the inner sleeve and the ultrasonic atomization piece. A liquid guide cotton in communication with the liquid passing port is sandwiched between the outer sleeve and the inner sleeve. The inner sleeve is longitudinally provided with a main air groove and an auxiliary air groove at intervals. The cross sectional area of the auxiliary air groove is ¼ to ⅛ the size of the cross sectional area of the main air groove. The main air groove
(Continued)

is in communication with the atomization cavity. An auxiliary air inlet, an auxiliary air channel, the auxiliary air groove, and the atomization cavity are in communication with each other.

15 Claims, 7 Drawing Sheets

(51) Int. Cl.

| | |
|---|---|
| ***A24F 40/44*** | (2020.01) |
| ***A24F 40/485*** | (2020.01) |
| ***B05B 17/06*** | (2006.01) |

(56) References Cited

U.S. PATENT DOCUMENTS

| | | | | |
|---|---|---|---|---|
| 2021/0076733 | A1* | 3/2021 | Liu | B05B 17/0684 |
| 2021/0267279 | A1* | 9/2021 | Liu | A24F 40/10 |
| 2022/0142246 | A1* | 5/2022 | Liu | A24F 40/40 |

FOREIGN PATENT DOCUMENTS

| | | | |
|---|---|---|---|
| CN | 206603257 | U | 11/2017 |
| CN | 206949542 | U | 2/2018 |
| CN | 208300933 | U | 1/2019 |
| CN | 210580992 | U | 5/2020 |

* cited by examiner

ELECTRONIC CIGARETTE ATOMIZING CORE AND ATOMIZER

CROSS REFERENCE TO RELATED APPLICATIONS

This application is a U.S. National Phase application under 36 U.S.C. § 371 of International Application No. PCT/CN2020/108057 filed on Aug. 10, 2020, which claims priority to Chinese Application No. 201910776454.0 filed on Aug. 22, 2019 and claims priority to Chinese Application No. 201921375561.4 filed on Aug. 22, 2019.

FIELD OF THE INVENTION

The present invention relates to an electronic cigarette utensil, in particular to an electronic cigarette atomizing core and an atomizer.

BACKGROUND OF THE INVENTION

In an existing ultrasonic atomizer, outside air enters an atomization cavity from an air inlet through an air inlet channel, and the flow rate of airflow does not affect the flow of e-liquid on liquid guide cotton. Different users have different smoking habits, some smoke quickly, and some smoke slowly. However, the quantity of e-liquid conducted to an ultrasonic atomization piece by the liquid guide cotton is limited. When the user smokes quickly, the liquid supply of the liquid guide cotton is insufficient, so that the ultrasonic atomization piece is prone to dry burning. When the user smokes slowly, the liquid supply of the liquid guide cotton is excessive, so that the ultrasonic atomization piece is easily immersed in the e-liquid or the user inhales e-liquid droplets.

SUMMARY OF THE INVENTION

The technical problem to be solved by the present invention is to overcome the shortcomings of the prior art and provide an electronic cigarette atomizing core that can automatically adjust the liquid supply of liquid guide cotton according to the airflow entering an atomization cavity, and provide an atomizer.

In order to solve the above technical problems, the present invention provides an electronic cigarette atomizing core, including an inner sleeve and an outer sleeve sleeved on the inner sleeve, the outer sleeve being provided with a liquid passing port, an ultrasonic atomization piece being disposed at a middle part of an inner cavity of the outer sleeve, a middle part of an inner cavity of the inner sleeve being connected to an air outlet tube, an atomization cavity being formed between the bottom of the inner sleeve and the ultrasonic atomization piece, liquid guide cotton communicated with the liquid passing port being sandwiched between the outer sleeve and the inner sleeve, wherein:

the inner sleeve is longitudinally provided with a main air groove and an auxiliary air groove at intervals, the cross sectional area of the auxiliary air groove is ¼ to ⅛ of the cross sectional area of the main air groove, the main air groove longitudinally penetrates the inner sleeve such that the main air groove is communicated with the atomization cavity to form a first air inlet channel, the auxiliary air groove is communicated with the liquid guide cotton, and a lower end of the auxiliary air groove is communicated with the atomization cavity; an upper part of the inner sleeve is provided with an auxiliary air inlet, and an auxiliary air channel is formed between the auxiliary air inlet and the auxiliary air groove, such that the auxiliary air inlet, the auxiliary air channel, the auxiliary air groove, and the atomization cavity are communicated with each other to form a second air inlet channel; and the first and second air inlet channels together constitute an outside air inlet channel.

When a user is smoking, outside air enters the atomization cavity through the first air inlet channel and takes smoke generated by ultrasonic atomization out through the air outlet tube. Meanwhile, a part of the outside air enters a liquid cartridge of an atomizer via the auxiliary air inlet, the auxiliary air channel, the auxiliary air groove and the liquid guide cotton to realize air and e-liquid replacement, so that the air pressure in the liquid cartridge increases, the outflow of e-liquid is accelerated, then the liquid guide cotton can absorb more e-liquid (because the ultrasonic atomization piece consumes e-liquid during operation, the e-liquid on the liquid guide cotton is unsaturated during ultrasonic atomization, and the liquid guide cotton can absorb more e-liquid when the flow rate of the e-liquid is increased), and enough e-liquid is provided for the operation of the ultrasonic atomization piece to prevent dry burning of the ultrasonic atomization piece. In addition, due to the effect of smoking, the air pressure of the atomization cavity is lower than outside air pressure, and the force of airflow passing through the second air inlet channel is in the same direction as the flow direction of the e-liquid on the liquid guide cotton, so the e-liquid on the liquid guide cotton can be conducted faster, which can prevent the e-liquid on the liquid guide cotton from producing bubbles to lower the liquid guide speed, and further avoid the phenomenon of dry burning of the ultrasonic atomization piece. When the user is not smoking, that is, the ultrasonic atomization of the ultrasonic atomization piece stops, and no outside airflow enters the atomization cavity via the second air inlet channel, the e-liquid on the liquid guide cotton is saturated. Due to the relatively high viscosity of e-liquid, the auxiliary air channel and the auxiliary air groove may be blocked by e-liquid droplets, which can slow down the flow of e-liquid and prevent the ultrasonic atomization piece from being immersed in the e-liquid. When the user smokes again, the ultrasonic atomization piece atomizes the saturated e-liquid on the liquid guide cotton, and the airflow passing through the second air inlet channel can impact the e-liquid blocking the auxiliary air groove and the auxiliary air channel onto the ultrasonic atomization piece to participate in the atomization, which ensures enough e-liquid participating in the atomization.

Further, the auxiliary air channel is disposed at a position corresponding to the liquid passing port, such that the air entering is close to the liquid cartridge, and the air passes through the liquid guide cotton and enters the liquid cartridge to realize air and e-liquid replacement more quickly.

Further, the main air groove is disposed on the outer wall of the inner sleeve, and the main air groove is misaligned with the liquid guide cotton, so that the main airflow passing through the main air groove does not affect the flow rate of e-liquid on the liquid guide cotton, and insufficient atomization of the e-liquid or immersion of the ultrasonic atomization piece in the e-liquid due to excessive flow of the e-liquid on the e-liquid guide cotton is avoided.

Further, the auxiliary air inlet is in the shape of an inverted frustum, so that air can smoothly enter the auxiliary air inlet.

Further, a lower part of the inner sleeve is provided with a third cavity integrally formed with the atomization cavity, and the third cavity is in the shape of a frustum. Therefore, when the ultrasonic atomization piece carries out ultrasonic atomization, the splashing e-liquid will be blocked by the inclined inner wall of the third cavity, which prevents the splashing e-liquid droplets from being taken out by the airflow in the air outlet tube and being inhaled by the user.

Further, guide grooves are longitudinally symmetrically disposed on the outer circumference of the inner sleeve, two ends of the liquid guide cotton are wrapped on the inner sleeve via the guide grooves, and the auxiliary air groove is disposed in the guide groove. In this way, when the liquid guide cotton is assembled, the liquid guide cotton is assembled in the longitudinal direction of the guide grooves, which can effectively prevent the liquid guide cotton from skewing to affect its liquid guide effect. A spring is disposed in the third cavity, and one end of the spring presses the liquid guide cotton on the ultrasonic atomization piece to form an atomization area.

Based on the same concept, the present invention provides an electronic cigarette atomizer, including the above-mentioned electronic cigarette atomizer core.

Further, the atomizer further includes a suction nozzle device and a liquid cartridge device connected to each other, the suction nozzle device is provided with a suction nozzle and an air inlet, the atomizing core is disposed at a middle part of the liquid cartridge device, and a liquid outlet of the liquid cartridge device is communicated with the liquid passing port of the atomizing core; the bottom of the suction nozzle is communicated with the air outlet tube, and the bottom of the air outlet tube extends into the atomization cavity via the inner sleeve, such that the atomization cavity, the inner cavity of the air outlet tube and the suction nozzle are communicated with each other to form a smoke discharge channel.

The atomizer of the present invention divides the intake airflow into two streams to enter the atomization cavity, the main airflow enters the atomization cavity through the main air groove to take away smoke, and the auxiliary airflow is in contact with the liquid guide cotton after passing through the auxiliary air channel and the auxiliary air groove to realize rapid replacement of air and e-liquid in the liquid cartridge and assist the power of e-liquid flowing on the liquid guide cotton. Meanwhile, the liquid guide cotton is communicated with the liquid outlet of the liquid cartridge, that is, the liquid guide cotton absorbs e-liquid and conducts the e-liquid to the upper surface of the ultrasonic atomization piece to be atomized into smoke. When the user's lung capacity is large and the smoking speed is fast, airflow passes through the auxiliary air channel and the auxiliary air groove relatively fast, so that air enters the liquid cartridge through the liquid guide cotton to replace with e-liquid fast, and the power of auxiliary airflow assists the flowing of e-liquid on the liquid guide cotton, which increases the liquid guide quantity of the liquid guide cotton and avoids the phenomenon of dry burning or a little smoke caused by insufficient e-liquid supply to the ultrasonic atomization piece for atomization. When the user's lung capacity is small and the smoking speed is slow, airflow passes through the auxiliary air groove relatively slow, so that air enters the liquid cartridge through the liquid guide cotton to replace with e-liquid slowly, and even the power of auxiliary airflow cannot impact e-liquid droplets in the auxiliary air groove, that is, the auxiliary airflow cannot assist the flowing of e-liquid on the liquid guide cotton, which reduces the liquid guide quantity of the liquid guide cotton and avoids the phenomenon of immersion in e-liquid due to excessive e-liquid supplied to the ultrasonic atomization piece or inhaling of the e-liquid due to insufficient atomization.

In the figures: 1—suction nozzle device; 11—suction nozzle; 12—air inlet;

2—liquid cartridge device; 21—liquid cartridge shell; 22—liquid cartridge; 23—liquid cartridge base; 221—liquid outlet;

3—air outlet tube;

4—atomizing core; 41—atomization cavity; 42—outer sleeve; 43—inner sleeve; 44—spring; 45—liquid guide cotton; 46—ultrasonic atomization piece; 47—electrode assembly; 48—silicone sleeve; 421—liquid passing port; 431—main air groove; 432—guide groove; 433—first cavity; 434—second cavity; 435—third cavity; 436—auxiliary air inlet; 437—auxiliary air channel; 4321—auxiliary air groove;

5—magnetic part;

6—fixed seat.

DETAILED DESCRIPTION OF THE EMBODIMENTS

The present invention will be further described below with reference to specific preferred embodiments, but the scope of protection of the present invention is not limited thereby.

For ease of description, the relative positional relationships (e.g., upper, lower, left, right, etc.) of components are described according to the layout direction of the accompanying drawings in the specification, and do not limit the structure of this patent.

Embodiment 1

Figure 1:
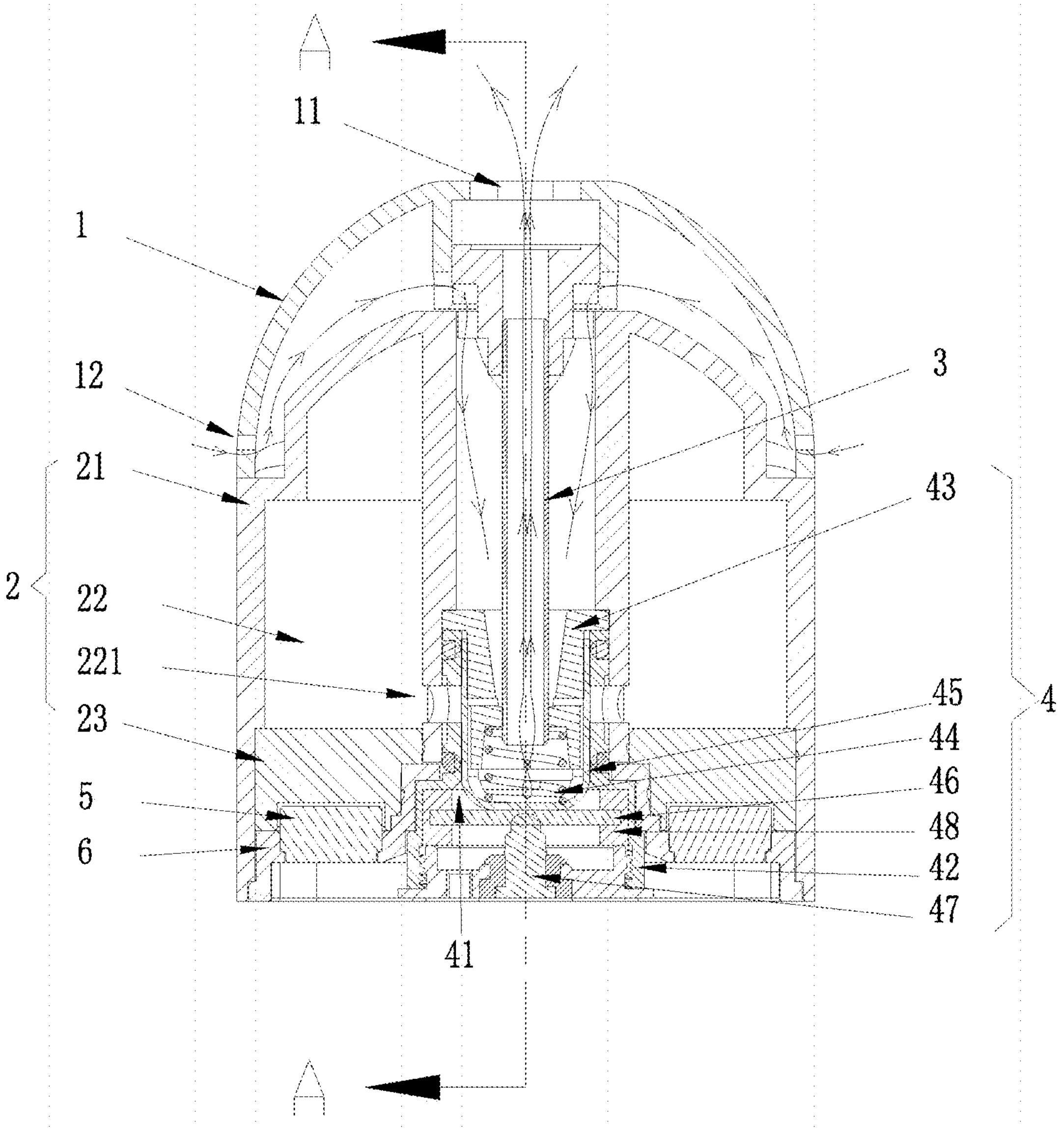
FIG. 1 is a schematic cross-sectional structure diagram of an atomizer of the present invention (arrows in the figure indicate the direction of airflow).
Figure 2:
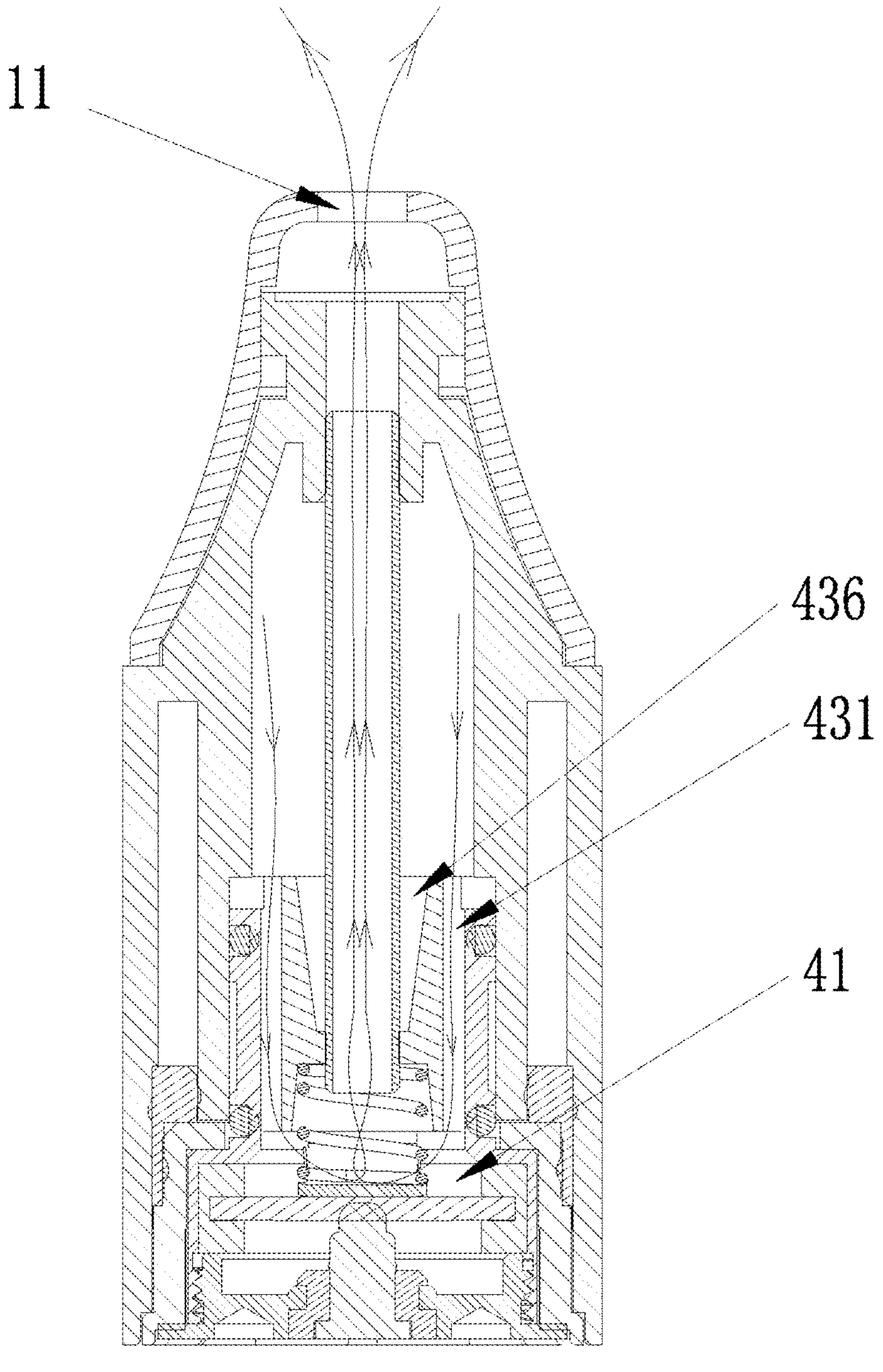
FIG. 2 is a cross-sectional view taken along line A-A of FIG. 1 (arrows in the figure indicate the direction of airflow).
Figure 3:
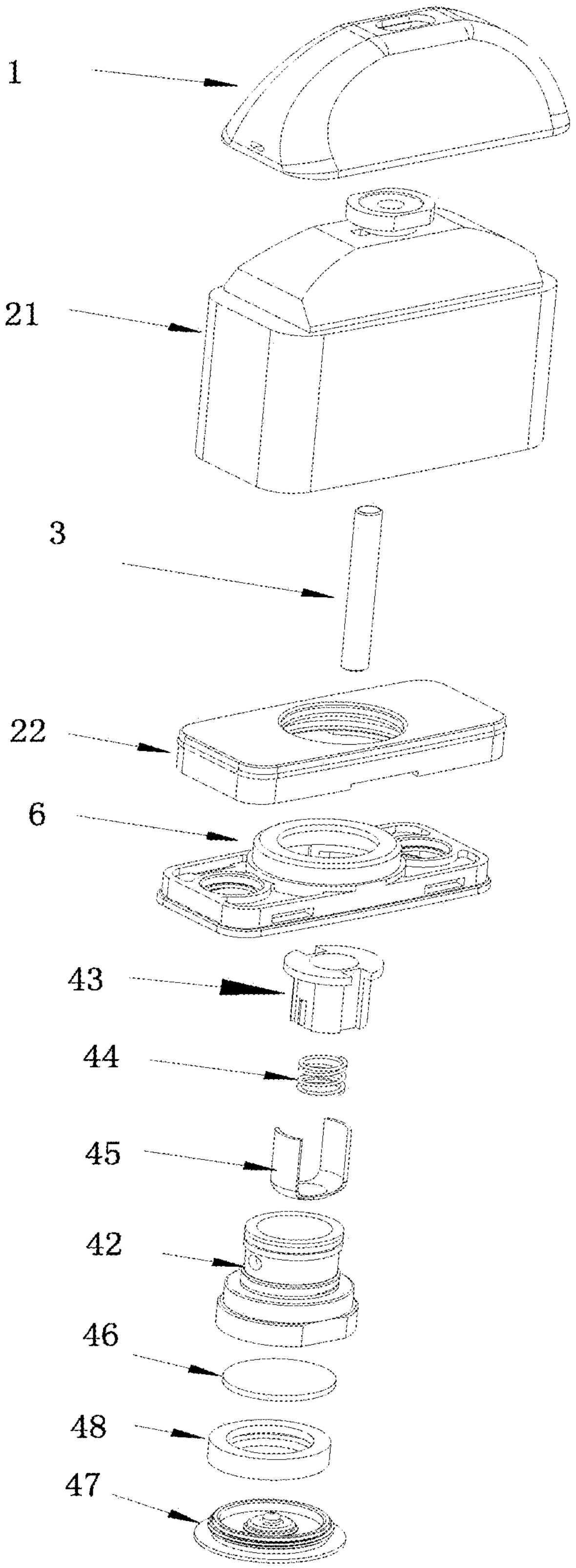
FIG. 3 is an exploded view of components of the atomizer of the present invention.
Figure 4:
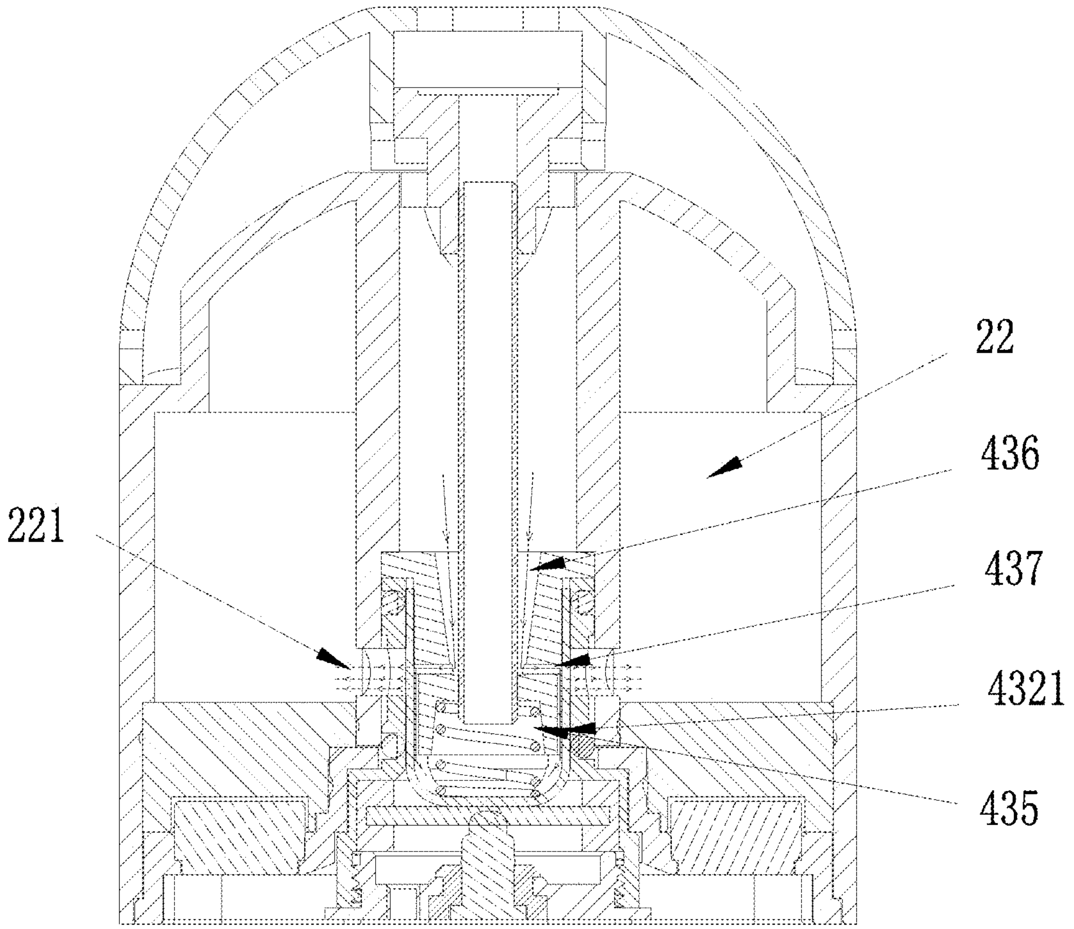
FIG. 4 is a state diagram of auxiliary airflow of the atomizer of the present invention (arrows in the figure indicate the direction of airflow).
Figure 5:
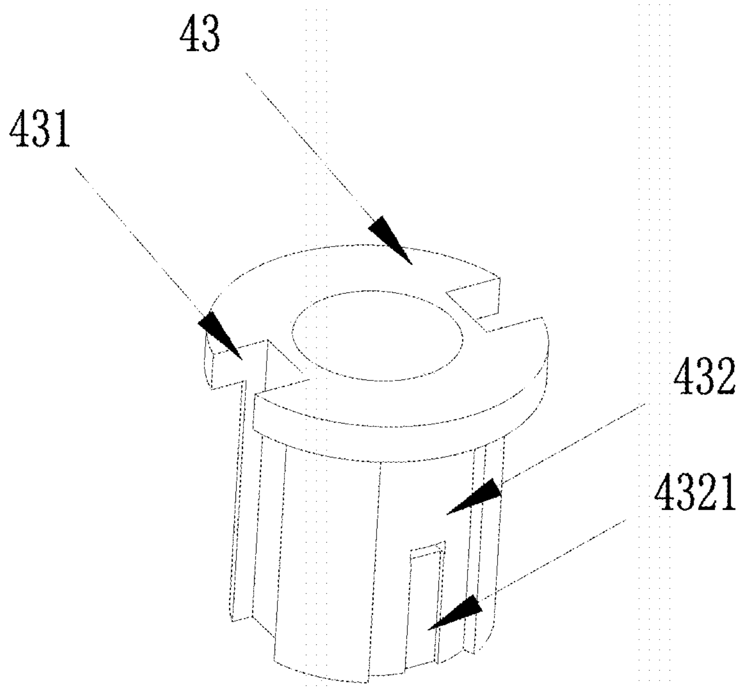
FIG. 5 is a three-dimensional structural diagram of an inner sleeve of the present invention.
Figure 6:
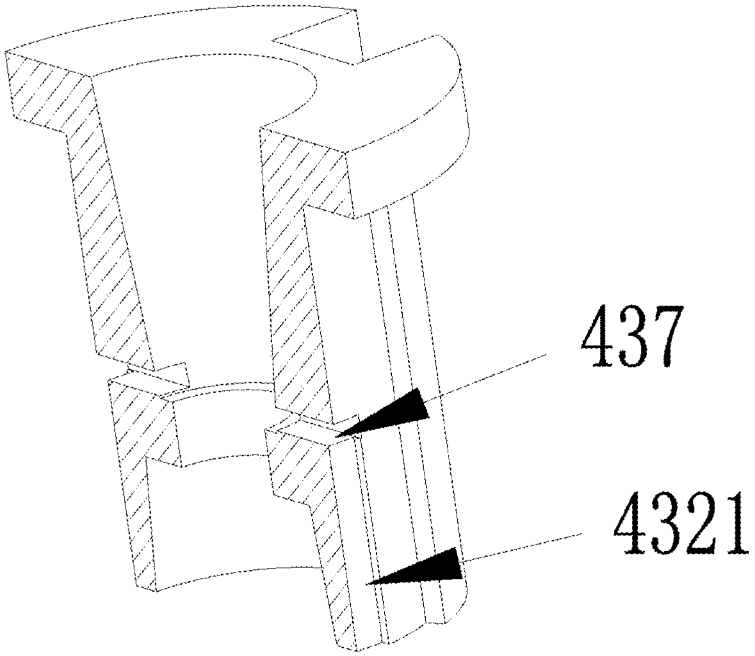
FIG. 6 is a three-dimensional cross-sectional structure diagram of the inner sleeve of the present invention.
Figure 7:
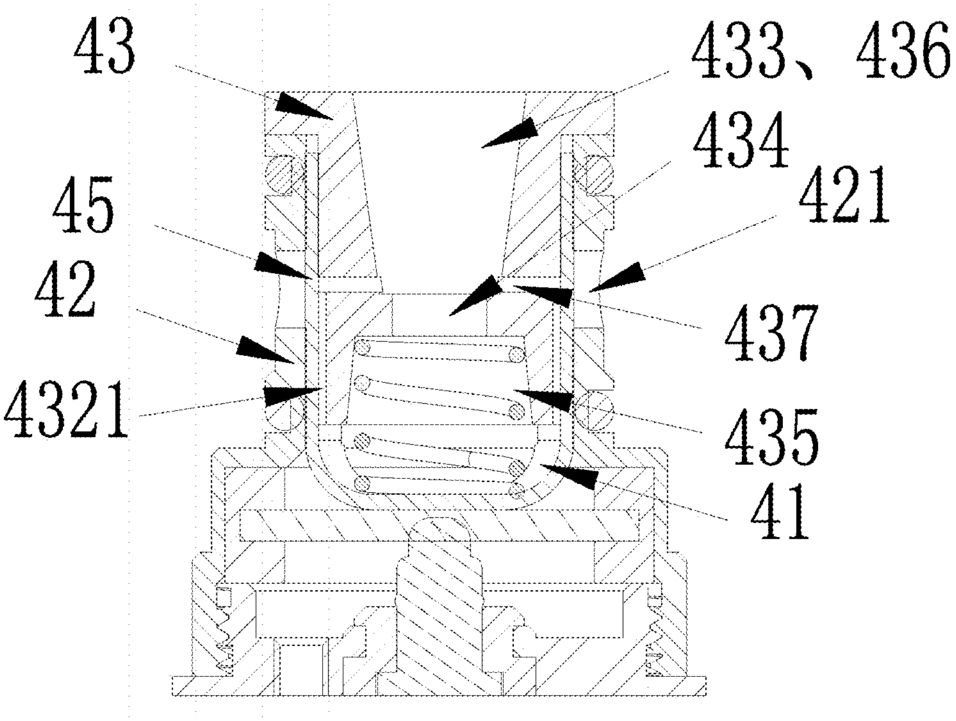
FIG. 7 is a schematic structural diagram of an atomizing core of the present invention.
Figure 8:
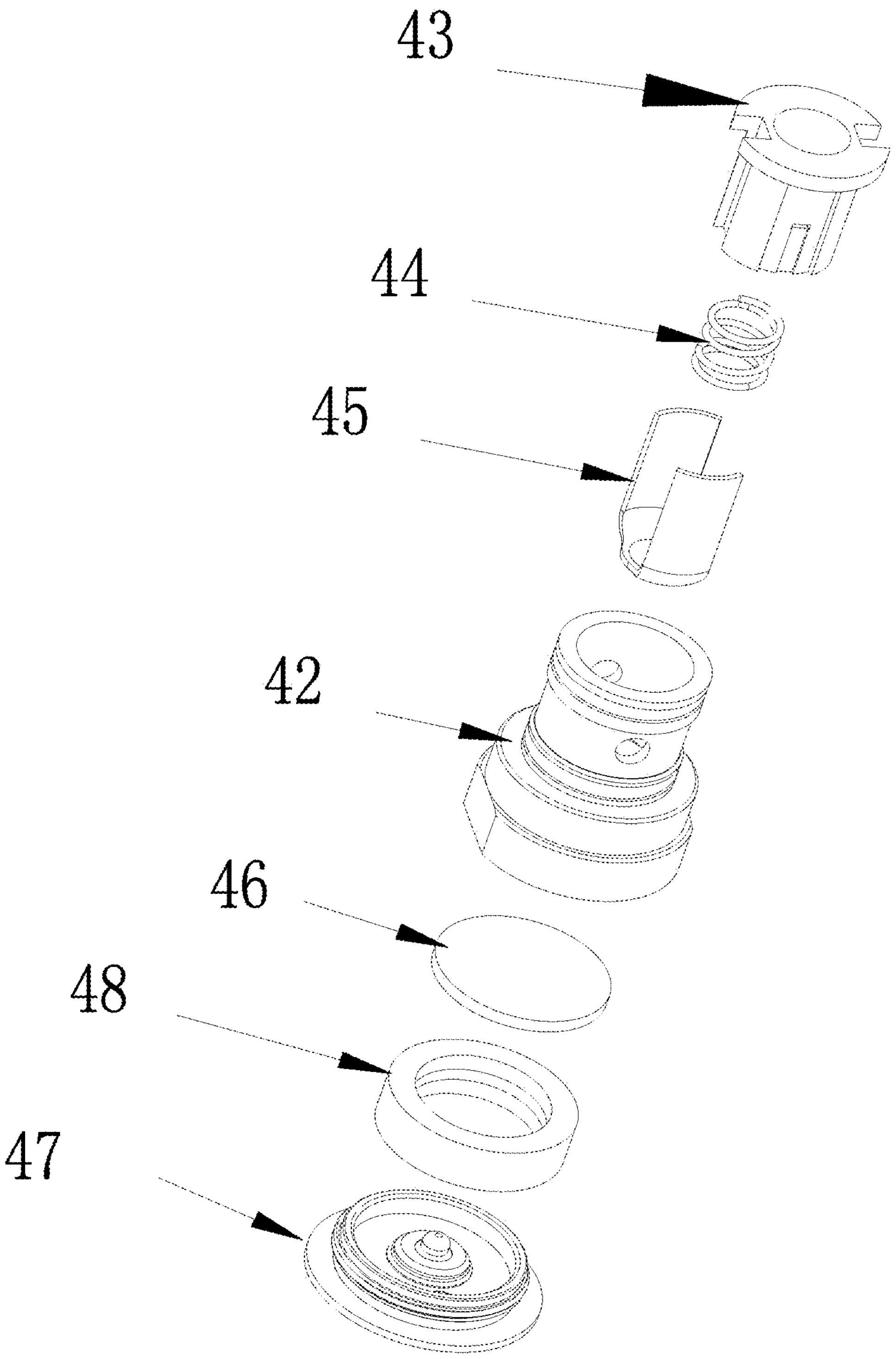
FIG. 8 is an exploded view of components of the atomizing core of the present invention.

As shown in FIGS. 1 to 8, an embodiment of an electronic cigarette atomizer according to the present invention includes a suction nozzle device 1 and a liquid cartridge device 2 connected to each other, the suction nozzle device 1 is provided with a suction nozzle 11 and an air inlet 12, an atomizing core 4 is disposed at a middle part of the liquid cartridge device 2, an atomization cavity 41 is formed in the atomizing core 4, the top of an air outlet tube 3 is communicated with the suction nozzle 11, and the bottom of the air outlet tube 3 extends into the atomization cavity 41, such that the atomization cavity 41, an inner cavity of the air outlet tube 3, and the suction nozzle 11 are communicated with each other to form a smoke discharge channel, and the air inlet 12, the outer circumference of the air outlet tube 3, and the atomization cavity 41 are communicated with each other to form an outside air inlet channel.

The liquid cartridge device 2 includes a liquid cartridge shell 21 and a liquid cartridge base 23 combined with each other. After the liquid cartridge shell 21 and the liquid cartridge base 23 are combined, a liquid cartridge 22 is formed therein. The liquid cartridge 22 is provided with a liquid outlet 221 facing the air outlet tube 3.

The atomizing core 4 includes an outer sleeve 42, and the outer sleeve 42 is provided with a liquid passing port 421 opposite to the liquid outlet 221. An inner sleeve 43, a spring 44, liquid guide cotton 45, an ultrasonic atomization piece 46, and an electrode assembly 47 are sequentially disposed in an inner cavity of the outer sleeve 42 from top to bottom. The atomization cavity 41 is formed between the bottom of the inner sleeve 43 and the ultrasonic atomization piece 46. A main air groove 431 and a guide groove 432 are symmetrically disposed on the outer circumference of the inner sleeve 43, one end of the main air groove 431 is communicated with the air inlet 12, and the other end is communicated with the atomization cavity 41. The guide groove 432 faces the liquid outlet 221, and an auxiliary air groove 4321 that connects the atomization cavity 41 with the liquid outlet 221 is disposed in the guide groove 432. An inverted frustum-shaped first cavity 433 is disposed at an upper part of an inner cavity of the inner sleeve 43, a cylindrical second cavity 434 connected to the air outlet tube 3 is disposed at the middle part, and a frustum-shaped third cavity 435 is disposed at the lower part. The air outlet tube 3 is inserted into the second cavity 434 via the first cavity 433 and fixedly connected to the second cavity 434, and an auxiliary air inlet 436 is formed between the first cavity 433 and the outer wall of the air outlet tube 3. An auxiliary air channel 437 is formed between the auxiliary air inlet 436 and the auxiliary air groove 4321, and the bottom of the air outlet tube 3 extends into the atomization cavity 41.

In this way, the air inlet 12 is communicated with the atomization cavity 41 via the main air groove 431 to form a first air inlet channel of the atomization cavity 41, the air inlet 12 is communicated with the atomization cavity 41 via the auxiliary air inlet 436, the auxiliary air channel 437, and the auxiliary air groove 4321 to form a second air inlet channel of the atomization cavity 41, and the first and second air inlet channels together constitute an outside air inlet channel.

The ultrasonic atomization piece 46 is disposed on a silicone sleeve 48, the liquid guide cotton 45 covers the inner sleeve 43 via the guide groove 432 of the inner sleeve 43 and is clamped by the outer sleeve 42, and the liquid guide cotton 45 faces the liquid outlet 221. The spring 44 is disposed in the third cavity 435, and the lower end of the spring 44 presses the liquid guide cotton 45 on the ultrasonic atomization piece 46 to form an atomization area.

The forgoing descriptions are only preferred embodiments of the present application, and do not limit the present application in any form. Although the present application is disclosed above with the preferred embodiments, the present application is not limited thereto. Some variations or modifications made by any skilled person familiar with the an using the disclosed technical contents without departing from the scope of the technical solution of the present application are equivalent to the embodiments, and all fall within the scope of the technical solution.

The invention claimed is:

1. An electronic cigarette atomizing core, comprising an inner sleeve (43) and an outer sleeve (42) sleeved on the inner sleeve (43), the outer sleeve being provided with a liquid passing port (421), an ultrasonic atomization piece being disposed at a middle part of an inner cavity of the outer sleeve, an atomization cavity (41) being formed between a bottom of the inner sleeve and the ultrasonic atomization piece, liquid guide cotton (45) communicated with the liquid passing port being sandwiched between the outer sleeve and the inner sleeve, wherein:

the inner sleeve is longitudinally provided with a main air groove (431) and an auxiliary air groove (4321) at intervals, the cross sectional area of the auxiliary air groove is ¼ to ⅛ of the cross sectional area of the main air groove, and the main air groove longitudinally penetrates the inner sleeve, such that the main air groove is communicated with the atomization cavity to form a first air inlet channel of the atomization cavity; an upper part of the inner sleeve is provided with an auxiliary air inlet (436), a lower end of the auxiliary air groove is communicated with the atomization cavity, an auxiliary air channel (437) is formed between the auxiliary air inlet and the auxiliary air groove, the liquid guide cotton covers the auxiliary air groove, and the auxiliary air inlet, the auxiliary air channel, and the auxiliary air groove are communicated with each other to form a second air inlet channel of the atomization cavity.

2. The electronic cigarette atomizing core according to claim 1, wherein the auxiliary air channel is horizontally disposed at a position corresponding to the liquid passing port.

3. The electronic cigarette atomizing core according to claim 1, wherein the main air groove is disposed on an outer wall of the inner sleeve, and the main air groove is misaligned with the liquid guide cotton.

4. The electronic cigarette atomizing core according to claim 1, wherein the auxiliary air inlet is in the shape of an inverted frustum.

5. The electronic cigarette atomizing core according to claim 1, wherein a lower part of the inner sleeve is provided with a cavity (435) integrally formed with the atomization cavity, and the cavity is in the shape of a frustum.

6. The electronic cigarette atomizing core according to claim 1, wherein guide grooves (432) are longitudinally symmetrically disposed on an outer circumference of the inner sleeve, two ends of the liquid guide cotton are wrapped on the inner sleeve via the guide grooves, and the auxiliary air groove is disposed in the guide grooves.

7. The electronic cigarette atomizing core according to claim 5, wherein a spring (44) is disposed in the cavity, and one end of the spring presses the liquid guide cotton on the ultrasonic atomization piece to form an atomization area.

8. An electronic cigarette atomizer, comprising the electronic cigarette atomizing core according to claim 1.

9. The electronic cigarette atomizer according to claim 8, further comprising a suction nozzle device (1) and a liquid cartridge device (2) connected to each other, wherein the suction nozzle device is provided with a suction nozzle (11) and an air inlet (12), the atomizing core is disposed at a middle part of the liquid cartridge device, and a liquid outlet (22) of the liquid cartridge device is communicated with the liquid passing port of the atomizing core; a bottom of the suction nozzle is communicated with an air outlet tube (3), and a bottom of the air outlet tube extends into the atomization cavity via the inner sleeve, such that the atomization cavity, an inner cavity of the air outlet tube and the suction nozzle are communicated with each other to form a smoke discharge channel.

10. An electronic cigarette atomizer, comprising the electronic cigarette atomizing core according to claim 2.

11. An electronic cigarette atomizer, comprising the electronic cigarette atomizing core according to claim 3.

12. An electronic cigarette atomizer, comprising the electronic cigarette atomizing core according to claim 4.

13. An electronic cigarette atomizer, comprising the electronic cigarette atomizing core according to claim 5.

14. An electronic cigarette atomizer, comprising the electronic cigarette atomizing core according to claim 6.

15. An electronic cigarette atomizer, comprising the electronic cigarette atomizing core according to claim 7.

* * * * *